No. 833,783. PATENTED OCT. 23, 1906.
C. B. HALL & F. A. THOMAS.
STEERING DEVICE FOR TRACTION ENGINES.
APPLICATION FILED JAN. 26, 1905.
2 SHEETS—SHEET 1.
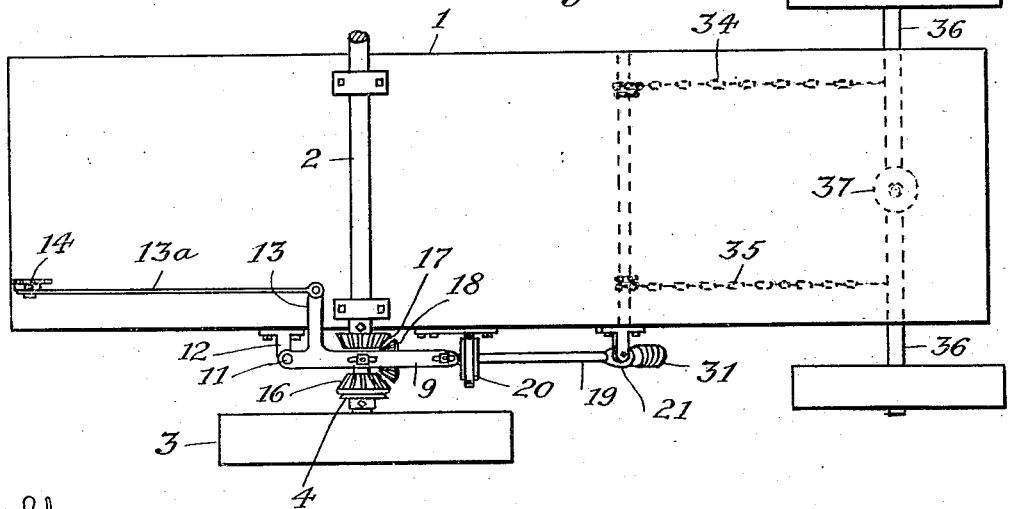
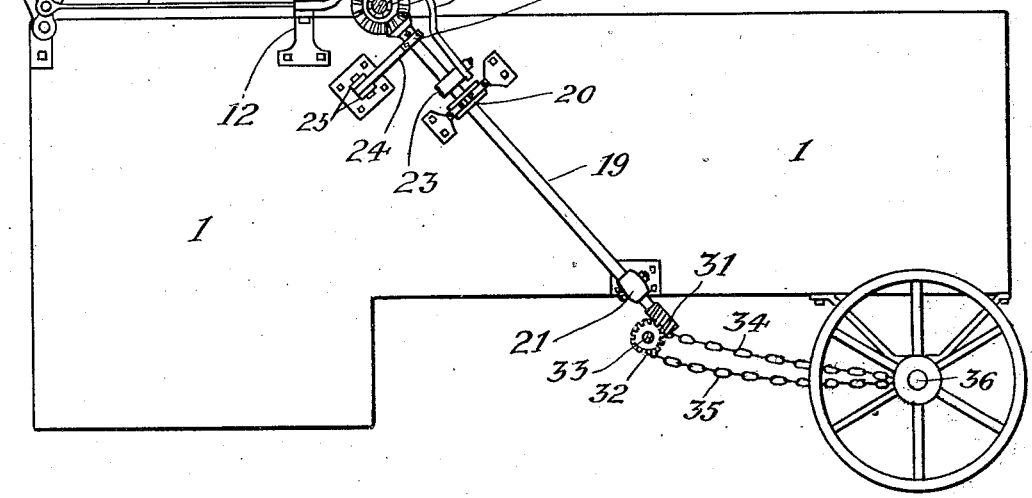
Witnesses:
Theo. Laggard.
H. A. Bowman.
Inventors:
Charles B. Hall
Frank A. Thomas
By P. H. Gunckel
Attorney.

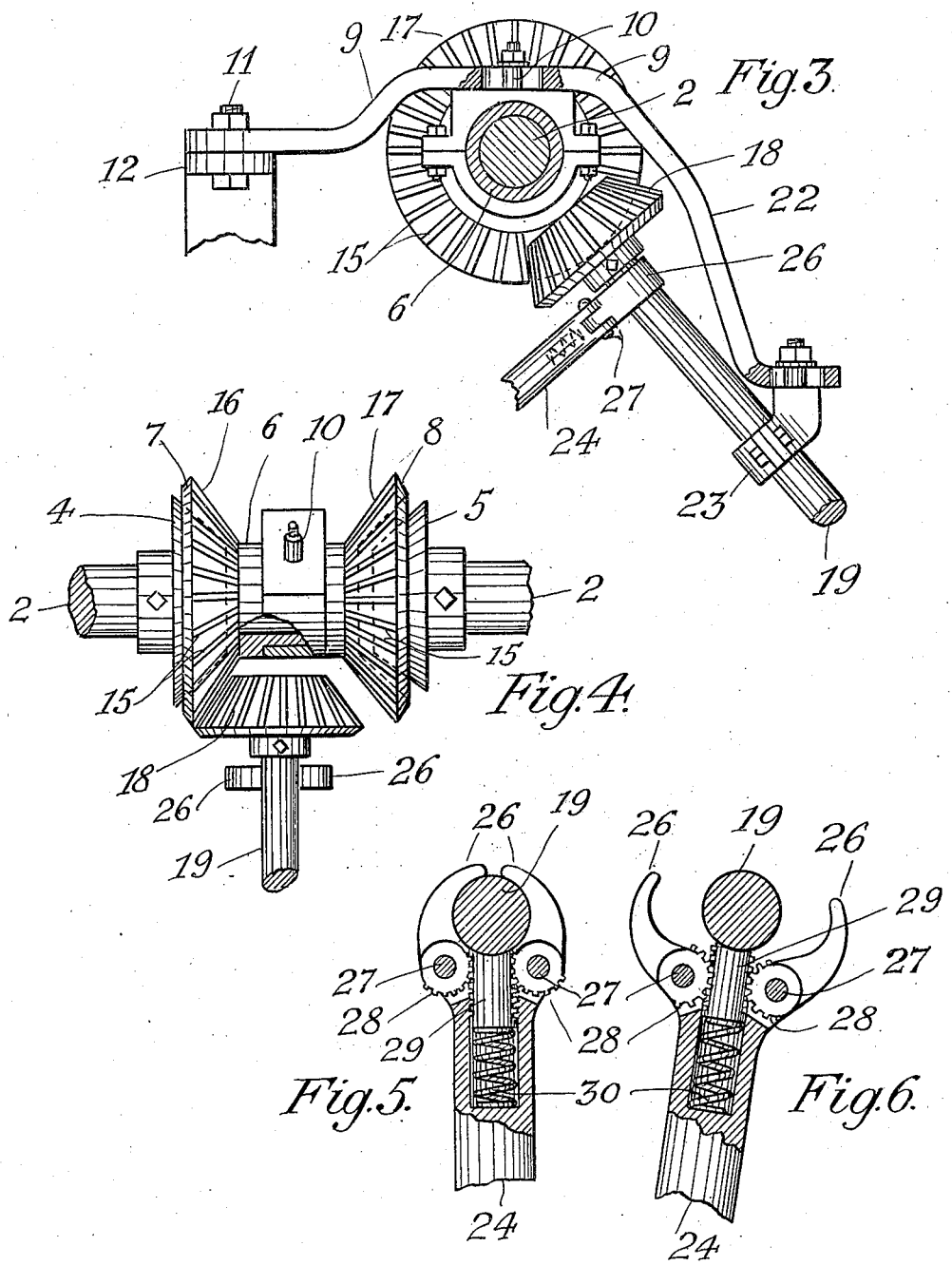

UNITED STATES PATENT OFFICE.

CHARLES B. HALL AND FRANK A. THOMAS, OF MINNEAPOLIS, MINNESOTA, ASSIGNORS, BY MESNE ASSIGNMENTS, OF ONE-THIRD TO SAID HALL, ONE-THIRD TO ANDRINE M. SORENSEN, AND ONE-THIRD TO DAVID N. DALRYMPLE, OF MINNEAPOLIS, MINNESOTA.

STEERING DEVICE FOR TRACTION-ENGINES.

No. 833,783. Specification of Letters Patent. Patented Oct. 23, 1906.

Application filed January 26, 1905. Serial No. 242,709.

*To all whom it may concern:*

Be it known that we, CHARLES B. HALL and FRANK A. THOMAS, citizens of the United States, residing at Minneapolis, county of Hennepin, and State of Minnesota, have jointly invented certain new and useful Improvements in Steering Devices for Traction-Engines, of which the following is a specification.

Our invention relates to the class of engines in which the axle of the front wheels is capable of being oscillated to change the direction of movement of the engine and to the devices for effecting such oscillatory movements.

The object of our invention is to provide devices adapted to utilize the power of the main driving-shaft for actuating them to change the position of the axle of the front wheels. This end we accomplish by means of friction-clutches on the driving-shaft, a manually-operated clutch-shifter, and suitable gears, shafts, and chain connections between the driving-shaft and the driven axle, whereby the inclined positions of the latter can be conveniently controlled.

Our improvements are illustrated in the accompanying drawings, in which—

Figure 1 is a plan view, and Fig. 2 a side elevation, partly in section, of a traction-engine equipped with our improvements. Fig. 3 is an enlarged view of part of the steering-gear as shown in Fig. 2. Fig. 4 is a top view, enlarged, of parts of the steering-gear as shown in Fig. 1; and Figs. 5 and 6 show detail views of the holder for the driven shaft of the steering-gear.

In the drawings, 1 designates the engine-boiler, 2 the main driving-shaft, and 3 a flywheel thereon. On the shaft 2 and rigidly secured thereto are cone-shaped friction clutch members 4 and 5, spaced a suitable distance apart, and between them on a loose slidable sleeve 6 are the correspondingly-shaped clutch members 7 and 8, the loose member 7 adapted to be actuated by frictional contact with the member 4 and the loose member 8 by contact with the member 5.

A clutch-shifter 9 is pivotally connected to a stud 10 on the loose sleeve 6 for sliding the clutch members 7 and 8 to or from contact with the running members 4 and 5 and has its rear end connected to a pivot 11 on a bracket 12 at the side of the boiler. An arm 13, extending inward from the body of the shifter 9, is pivotally connected to a rod 13$^a$, the rear end of which is connected to an ordinary hand-lever 14. By operating the latter the sleeve 6 may be moved in either direction to bring the frictional surfaces of the clutches to contact or to move both to intermediate idle positions. On the adjacent surfaces of the clutch members 7 and 8 are cogs or teeth 15, constituting them bevel-gears 16 and 17, and in the intermediate space at the lower front side of the sleeve 6 is a bevel-gear 18, adapted to intermesh with either of the gears 16 or 17. The bevel-gear 18 is attached to the upper end of a shaft 19, which extends downward and forward at the side of the boiler. To permit the upper end of this steering-shaft to be moved laterally to carry the bevel-gear 18 to and from operative positions, its upper portion is journaled in a box 20, in which it may have (or which box may have) slight lateral movement, and its lower end is journaled in a pivoted box 21. A forward and downward extension 22 of the shifter-bar 9 is attached to a loose collar 23 on the shaft 19, which enables the shaft to be shifted laterally to move the gear 18 to contact with the appropriate gear 16 or 17 at the same time that the shifter moves the corresponding friction clutch member to operative position.

The device for holding the steering-shaft 19 in middle position, and hence the bevel-gear 18 in inoperative position, consists of a rod 24, pivotally connected to a support 25 at the side of the boiler, and a pair of gripper-jaws 26, connected to the head of the bar by pintles 27 and having cogs 28 for engaging a short rack-bar 29, inserted in a central socket in the rod 24, the rack-bar being seated on a spring 30. In normal position—that is, when the shaft 19 is in intermediate position—the jaws grip the shaft, as indicated in Fig. 5, and when the shaft is shifted toward either side the distance between it and the pivoted base of the holder-rod 24 is increased sufficiently to allow the spring 30 to lift the rack and spread the jaws, as indicated in Fig. 6.

The lower end of the shaft carries a worm 31, in mesh with a cog-wheel 32 on a transverse shaft 33, and to the latter near its opposite ends are attached chains 34 and 35, which wind thereon in opposite directions, and the forward ends of the chains are attached to the axle 36 of the front wheels. This axle is arranged in the usual way to enable it to be turned on a central pivot 37. It will be obvious that when the shaft 19 is rotating one of the chains will be caused to shorten and the other to lengthen, and thus turn the axle on its pivot, and that a reversal of the chain movements will be produced by a change in the direction of rotation of the shaft 19.

Having described our invention, what we claim, and desire to secure by Letters Patent, is—

1. In a steering device for traction-engines, the combination with a driving-shaft, an oscillatory wheel-axle, a winding-shaft and chains connecting such axle and winding-shaft, of a steering-shaft arranged to turn the winding-shaft and carrying a bevel-gear on its upper end, a pair of cone-shaped friction-clutches fixed on the driving-shaft, an intermediate slidable sleeve, a pair of corresponding clutch members carried by the sleeve, bevel-gears provided on the adjacent faces of the latter members, and a clutch-shifter for sliding said sleeve and moving the steering-shaft to move the clutches and gears to and from operative positions, substantially as set forth.

2. In a steering device for traction-engines, the combination with a driving-shaft, a pair of cone-shaped friction-clutches fixed thereon, an intermediate slidable sleeve, a pair of corresponding clutch members carried by the sleeve, bevel-gears provided on the adjacent faces of the latter members, a laterally-movable steering-shaft, a bevel-gear carried thereon, and a manually-operated clutch-shifter for simultaneously moving the clutches and gears to and from contact positions, substantially as set forth.

3. The combination with a driving-shaft and an oscillatory wheel-axle, of steering devices comprising friction-clutches fixed on said shaft, a slidable sleeve carrying the movable clutch members, bevel-gears formed on the latter, an intermediate free movable bevel-gear, a steering-shaft carrying the latter, a clutch-shifter arranged to simultaneously move the movable clutch members and said gears to and from contact, a winding-shaft operated by the steering-shaft, and suitable connections between the axle and the winding-shaft, substantially as set forth.

4. The combination with a driving-shaft, of a pair of friction clutch members fixed thereon, a pair of movable clutch members between them, having bevel-gears formed on their opposite faces, a slidable sleeve carrying such movable members, an intermediate gear, a laterally-movable steering-shaft carrying the latter gear, and a controllable shifting device for simultaneously moving the clutches and gears to and from contact positions, substantially as set forth.

5. The combination with a steering-shaft and a bevel-gear carried thereon, of a driving-shaft, a pair of cone-shaped friction clutch members fixed thereon, an intermediate slidable sleeve, a pair of corresponding clutch members carried by the sleeve, bevel-gears provided on the adjacent faces of the latter members, and a clutch-shifter for sliding said sleeve and moving the steering-shaft to move the clutches and gears to and from operative positions, substantially as set forth.

In testimony whereof we have signed our names to this specification, in the presence of two subscribing witnesses, this 26th day of November, 1904.

CHARLES B. HALL.
FRANK A. THOMAS.

Witnesses:
  JAMES NELSON,
  A. A. ALLEN.